United States Patent [19]
Hudecek et al.

[11] 3,971,744
[45] July 27, 1976

[54] METHOD FOR PREPARATION OF EMULSIONS, CONCENTRATED DISPERSIONS AND PASTES

[75] Inventors: Slavko Hudecek; Ivana Gavrilova, both of Prague, Czechoslovakia

[73] Assignee: Ceskoslovenska akademie ved, Prague, Czechoslovakia

[22] Filed: July 11, 1974

[21] Appl. No.: 487,562

[30] Foreign Application Priority Data
July 16, 1973 Czechoslovakia .................. 5087-73

[52] U.S. Cl. ...................... 260/23 EM; 260/30.6 R; 260/31.8 G; 260/33.64 A
[51] Int. Cl.² .......................................... C08L 91/00
[58] Field of Search ..... 260/23 EM, 30.6 R, 31.8 G, 260/31.8 H, 33.64 A

[56] References Cited
UNITED STATES PATENTS
3,189,587  6/1965  Donat ............................ 260/23 EM
3,382,198  5/1968  Elslager ........................ 260/23 EM
FOREIGN PATENTS OR APPLICATIONS
611,904  11/1948  United Kingdom............ 260/23 EM

*Primary Examiner*—Donald E. Czaja
*Assistant Examiner*—William E. Parker
*Attorney, Agent, or Firm*—Murray Schaffer

[57] ABSTRACT

A method for producing emulsions, concentrated dispersions and pastes based on plasticizers and hydrophilic fillers consists in polymerization of a mixture of monomers, at least one of which contains one or two carboxylic groups, alternatively in a form of anhydride, and the other contains more than one vinyl group in its molecule, by common free-radical initiators in a medium of a plasticizers or a mixture of plasticizers with an admixture of saturated or unsaturated higher fatty acids, either substituted by halogen or unsubstituted, and/or higher alcohols. The resulting polymer of the maximum particle size 100 $\mu$m is transformed into the Na, K, or $NH_4$ form. The emulsion, concentrated dispersion or paste is applied without further operations in processing of plastics, especially in production of plastic and synthetic leathers.

21 Claims, No Drawings

METHOD FOR PREPARATION OF EMULSIONS, CONCENTRATED DISPERSIONS AND PASTES

The invention relates to a method for preparation of emulsions, concentrated dispersions and pastes based on plasticizers and hydrophilic fillers.

Plasticizers and fillers play an important role in the industry of plastics, because they modify or give physical, practical, mechanical, and processing properties to the final product, which properties the original plastics either did not possess or did not exhibit in the required measure. From numerous examples poly(vinyl chloride) can be quoted as a typical representative which finds a broad use in a diversified assortment just thanks to the application of suitable plasticizers and fillers. The main part of the poly(vinyl chloride) production is processed into a form of various kinds of flat materials, the considerable part of which form plastic and synthetic leathers. The plasticizers concentration ranges between 20 and 50 wt.% of these materials.

If a filler has to be added in the preparation of the aforesaid or other materials from plastics, it is used in a form of premixtures, i.e. of dispersions in the plasticizers of various concentrations. These premixtures enable the more accurate metering and better dispergation in the further processing. Consequently, the preparation of premixtures always requires a separate operation in the processing plant and proceeds always from the filler and the suitable type of plasticizers which has to be first mixed in a suitable blender and then thoroughly homogenized in an attrition mill. Both these basic operations are relatively time and energy consuming.

As hydrophilic fillers are here understood water insoluble powdered polymers with the maximum particle size 100 $\mu$m which are able to absorb reversibly water vapors in the minimum amount 35% calculated on their weight in a dry state and which represent a relatively new type of fillers. They have a special importance in production of plastic leathers with so called "hygienic properties". These fillers may be prepared in a dry powdered form either by milling of a suitable hydrophilic polymer, for example, at the deep cooling or by the direct procedure according to the U.S. patent application Ser. No. 372,997, now abandoned. However, losses of the used solvents occur during this procedure and another disadvantage consists in the necessity to use several operations in various equipments.

All these shortcomings are overcome by the method according to this invention, wherein emulsions, concentrated dispersions and pastes based on plasticizers and the hydrophilic fillers are prepared in a suitable form, which does not require any further operation and is suitable for the aforesaid application, by polymerizing the mixture of monomers, at least one of which contains one or two carboxylic groups (which may be alternatively in a form of anhydride) and the other contains more than one vinyl group, in the presence of commonly known initiators and in the medium consisting of a plasticizer or a plasticizer mixture with the addition of higher alcohols and/or saturated or/and unsaturated higher fatty acids, either simple or halogenated, and by the subsequent transfer of the resulting polymer with the maximum particle size 100 $\mu$m, into the Na, K, or NH$_4$ form.

The mixture of monomers is formed on the one hand by monomers with one or more carboxylic groups, as is acrylic, methacrylic, fumaric, or maleic acid, or maleic anhydride, and further crotonic, $\alpha$-chlorocrotonic, ethacrylic, citraconic, mesaconic, itaconic, and ethylmaleic acid, and on the other by divinylbenzene, ethylene glycol dimethacrylate or diacrylate, diethylene glycol dimethacrylate or diacrylate, glycol divinyl ether, divinyl adipate, allylvinylether, diallyl fumarate, triallyl cyanurate, divinyltoluene, trivinylbenzene, divinylnaphthalene, and the like, while the concentration of the monomer from the second group ranges between 0.1 and 40 wt.%, preferably between 5 and 20 wt.% based on the total amount of monomer.

Well known types of plasticizers which are liquid at the polymerization temperature and does not interfere the reaction course by their chemical character, may be used as the polymerization medium. These are, above all, the plasticizers from the group of phthalates, adipates, azelates, sebacinates, citrates, phosphates, and the like, e.g. dibutyl phthalate, dioctyl phthalate, ethylhexyl phthalate, butylbenzyl phthalate, diisooctyl phthalate, dioctyl adipate, dioctyl sebacinate, diisooctyl azelate, benzyloctyl adipate, triethyl citrate, tributyl citrate, diphenyloctyl phosphate, tricresyl phosphate, diphenylcresyl phosphate, etc. The concentration of monomers in this medium ranges between 5 and 30 wt.%, preferably between 15 and 25 wt.%.

The copolymerization of the aforesaid monomers may be initiated by common types of initiators of the free-radical polymerization. Their typical representatives are dialkyl- and diaryl peroxides, hydroperoxides, azobisisobutyronitrile, peroxocarbonates, and also redox systems, as diisopropyl peroxocarbonate-dimethylaniline, and the like, in the amount of 0.1 to 5 wt.% calculated on the sum of monomers.

The admixture of higher alcohols (C $\geq$ 8) or saturated or unsaturated carboxylic acid (C $\geq$ 12) either unsubstituted or halogenated (1 – 4 Cl or Br atoms per 1 molecule of the acid) may be advantageously added into the polymerization medium in the amount of 0.5 – 5 wt.%, based on the total amount of monomers. As the above mentioned compounds, they may be used e.g. octanol, isooctanol, dodecylalcohol, cetylalcohol, and further lauric, palmitic, stearic, oleic, elaidic, linoleic, linolenic acid and their chloro or brome derivatives.

The copolymer formed is transformed into its Na, K, or NH$_4$ form advantageously by means of aqueous or water-alcoholic or alcoholic solutions of the corresponding hydroxides or carbonates. This conversion into the corresponding polymeric salt is carried out on 50 – 90% calculated on the concentration of carboxylic groups in the copolymer.

According to the chosen concentration of monomers, the invented method provides either an emulsion or a concentrated dispersion up to a paste of the hydrophilic filler with a high sorption efficiency in a plasticizer or in a mixture of plasticizers, which can be applied without further operation in the production of all kinds of flat materials, above all plastic and synthetic leathers, preserving all advantages of the premixture use at the same time. The production according to the invention is highly effective, because no losses of raw materials occur during the proposed procedure, neither wastes or exhalations. As follows from the following examples, the preparation according to the invention requires no special equipment and may be realized in reactors of the common type or in heated malaxaters, and the like.

The invention is illustrated in several following examples.

EXAMPLE 1

A three-necked 2000 ml glass flask equipped with an effective stirrer, a reflux condenser, a thermometer, and an inlet tube for inert gas is charged with

| | |
|---|---|
| dioctyl phthalate | 400 g |
| butylbenzyl phthalate | 400 g |
| acrylic acid | 160 g |
| divinylbenzene (assay 65.54%) | 61 g |
| laurylalcohol | 4 g |
| and azobisisobutyronitrile | 6 g |

Nitrogen is bubbled through the reaction mixture for 20 min and then the content of the flask is heated in a water bath to 50°C. This temperature is maintained for 5 hours during stirring. The resulting paste is cooled down, placed in a morter and transformed into the Na form by grinding with water-alcoholic solution of NaOH (44.4 g in 100 ml of 50% ethanol). The product formed has a vaselinic consistence. The copolymer particles are very homogeneously dispersed in the used mixture of plasticizers.

EXAMPLE 2

The apparatus described in Example 1 is charged with

| | |
|---|---|
| dioctyl azelate | 900 g |
| methacrylic acid | 85 g |
| divinylbenzene (assay 65.54%) | 22.8 g |
| dibenzoyl peroxide | 2 g |
| lauric acid | 5 g |

The polymerization temperature is 70°C, polymerization time 8 hr. The transformation into the Na form is carried out by the aqueous solution of sodium hydroxycarbonate (149.8 g NaHCO₃ in 500 ml H₂O); this corresponds to the conversion of 60%.

EXAMPLE 3

The apparatus described in Example 1 is charged with a mixture consisting of

| | |
|---|---|
| dioctyl adipate | 800 |
| acrylic acid | 160 g |
| divinylbenzene (assay 65.54%) | 61 g |
| diisopropyl peroxocarbonate | 2 ml |
| dimethylaniline | 2 ml |
| trichlorostearic acid | 4 g |

This mixture is polymerized at the ambient temperature (24°C) for 7 hours. The copolymer is transferred into ammonium salt on 90% by means of aqueous ammonia (34 g NH₃ in 150 ml of H₂O). The paste formed exhibits better compatibility with poly(vinyl chloride).

EXAMPLE 4

A stainless-steel malaxter of the volume 20 l equipped with two counter-revolving S-shaped stirrers, a duplicator, a thermometer, and a nitrogen inlet is charged with:

| | |
|---|---|
| dioctyl sebacate | 7000 g |
| acrylic acid | 1500 g |
| methacrylic acid | 1500 g |
| divinylbenzene (assay 65.54%) | 4.5 g |
| dibenzoyl peroxide | 90 g |
| oleic acid | 15 g |

The mixture is purged with nitrogen and then heated by means of the duplicator (used as a water bath) to 65°C for 6 hours. The resulting paste is cooled down and 1720 g KOH in 2000 ml water is added under the continuous stirring and cooling into the mixture (corresponds to the conversion of 80%).

EXAMPLE 5.

The malaxater described in Example 4 is charged with

| | |
|---|---|
| tricresyl phosphate | 9500 g |
| maleic anhydride | 300 g |
| divinylbenzene (assay 65.54%) | 305 g |
| diisopropyl peroxocarbonate | 20 g |
| palmitic acid | 60 g |

The preparation procedure is similar as in the preceding example; the polymerization temperature is 35°C. The transformation into the Na form is carried out after completion of the polymerization by a mixture of 245 g NaOH in 300 ml of water during cooling and stirring.

The aforegiven examples only illustrate the invention without limiting its scope by any means.

We claim:

1. A method of producing emulsions, concentrated dispersions and pastes comprising the steps of initially forming a plasticizing medium by mixing at least one plasticizer with an ingredient selected from the group consisting of fatty acids having more than 12 C atoms, alcohols having more than 8 C atoms and combinations of said fatty acids and alcohols, dissolving in the medium thus obtained 5 to 30 wt.% of a mixture of monomers selected from the group consisting of at least one monomer containing at most two carboxylic groups and a second monomer containing more than one vinyl group, thereafter polymerizing said monomer mixture in said plasticizing medium in the presence of a free-radical initiator for a time sufficient to form a particulate polymer having a maximum particle size of 100 μm and thereafter transforming said polymer into its Na, K or NH₄ salt by contacting the polymer with an aqueous solution of the corresponding hydroxide or carbonate.

2. The method as set forth in claim 1, wherein said plasticizers are selected from the group consisting of phthalates, adipates, azelates, sebacinates, citrates, and phosphates.

3. The method as set forth in claim 1, wherein said plasticizers are selected from a group consisting of dibutyl phthalate, dioctyl phthalate, ethylhexyl phthalate, butylbenzyl phthalate, diisooctyl phthalate, dioctyl adipate, dioctyl sebacinate, diisooctyl azelate, benzyloctyl adipate, triethyl citrate, tributyl citrate, diphenyloctyl phosphate, tricresyl phosphate, diphenylcresyl phosphate.

4. The method as set forth in claim 1, wherein said saturated higher fatty acids are selected from a group consisting of lauric, palmitic, and stearic acid.

5. The method as set forth in claim 1, wherein said unsaturated higher fatty acids are selected from a group consisting of oleic, elaidic, linoleic, and linolenic acid.

6. The method as set forth in claim 1, wherein said halogenated saturated higher fatty acid contains 1 to 4 chlorine atoms in one molecule of the acid.

7. The method as set forth in claim 1, wherein said halogenated unsaturated higher fatty acid contains 1 to 4 chlorine atoms in one molecule of the acid.

8. The method as set forth in claim 1, wherein said halogenated saturated higher fatty acid contains 1 to 4 bromine atoms in one molecule of the acid.

9. The method as set forth in claim 1, wherein said halogenated unsaturated higher fatty acids contain 1 to 4 bromine atoms in one molecule of the acid.

10. The method as set forth in claim 1, wherein said higher alcohols are selected from a group consisting of octanol, isooctanol, dodeylalcohol, cetylalcohol.

11. The method as set forth in claim 1, wherein said monomer containing one or two carboxylic groups is selected from a group consisting of mono- and dicarboxylic acids.

12. The method as set forth in claim 1, wherein said monomer containing one or two carboxylic groups is selected from a group consisting of acrylic, methacrylic, fumaric, maleic, crotonic, ethacrylic, citraconic, mesaconic, itaconic, and ethylmaleic acid.

13. The method as set forth in claim 1, wherein said monomers containing more than one vinyl groups are selected from a group comprising divinylbenzene, ethylene glycol dimethacrylate or diacrylate, diethylene glycol dimethacrylate or diacrylate, glycol divinyl ether, divinyl adipate, allylvinylether, diallyl fumarate, triallyl cyanurate, divinyltoluene, trivinylbenzene, divinylnaphthalene.

14. The method as set forth in claim 1, wherein said monomer containing more than one vinyl group is present in the amount of 0.1 to 40 wt.% based on the total amount of monomers.

15. The method as set forth in claim 1, wherein said monomer containing more than one vinyl group is present in the amount of 5 to 25 wt.% based on the total amount of monomers.

16. A hydrophilic polymeric product produced according to the method as set forth in claim 1.

17. An emulsion concentrated dispersion or paste adapted for application in the processing of plastics and produced according to the method as set forth in claim 1.

18. A plastic article containing a plastic material and the emulsion, the concentrated dispersion or the paste as set forth in claim 17.

19. The method as set forth in claim 1, comprising the step of preparing said plasticizer by mixing a plasticizer with a hydrophilic filler.

20. The method as set forth in claim 1, wherein said fatty acid is selected from the group consisting of unsubstituted saturated, unsubstituted unsaturated, halogenated saturated and halogenated unsaturated forms of said fatty acids.

21. The method as set forth in claim 1, wherein said carboxylic monomer is used in the anhydride form.

* * * * *